(12) United States Patent
Sherman

(10) Patent No.: US 6,457,671 B1
(45) Date of Patent: Oct. 1, 2002

(54) FUNNELED ROTARY FOIL

(76) Inventor: Norman Sherman, 17 South Meadows, Woodbury, CT (US) 06798

( * ) Notice: Subject to any disclaimer, the term of this patent is extended or adjusted under 35 U.S.C. 154(b) by 0 days.

(21) Appl. No.: 09/682,455

(22) Filed: Sep. 5, 2001

(51) Int. Cl.[7] .............................................. B64C 27/00
(52) U.S. Cl. ...................... 244/39; 244/17.11; 244/198; 244/65; 416/223 R; 416/227 R
(58) Field of Search ................. 244/39, 17.11, 244/17.25, 198, 65; 416/223 R, 227 R

(56) References Cited

U.S. PATENT DOCUMENTS

| | | | | |
|---|---|---|---|---|
| 1,787,321 A | * | 12/1930 | Orr | 244/198 |
| 4,840,540 A | * | 6/1989 | Kallergis | 416/223 A |
| 4,976,349 A | * | 12/1990 | Adkins | 244/198 |
| 5,217,349 A | * | 6/1993 | Succi | 415/119 |
| 5,772,155 A | * | 6/1998 | Nowak | 244/199 |
| 6,138,954 A | * | 10/2000 | Gaunt | 244/198 |
| 6,260,809 B1 | * | 7/2001 | Egolf et al. | 244/198 |

\* cited by examiner

*Primary Examiner*—J. Woodrow Eldred
(74) *Attorney, Agent, or Firm*—William C. Crutcher

(57) ABSTRACT

A funnel strip is added to a rotary airfoil, which utilizes the Bernoulli principle to increase the velocity of air over the suction side of the rotating airfoil to increase the lift. The device is applicable to thrust-producing devices, such as propellers, as well as to wind-powered devices.

9 Claims, 3 Drawing Sheets

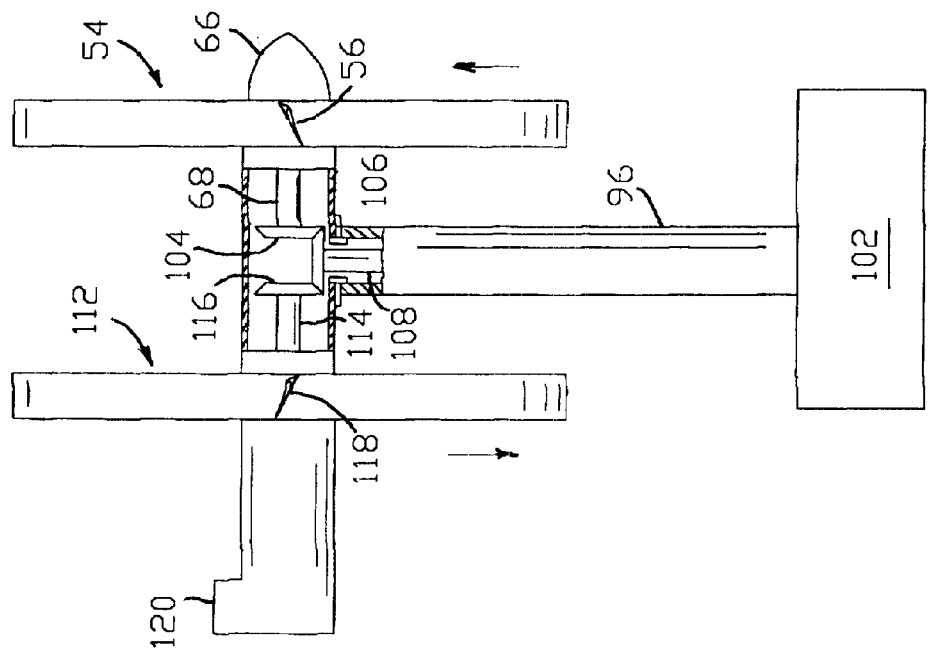
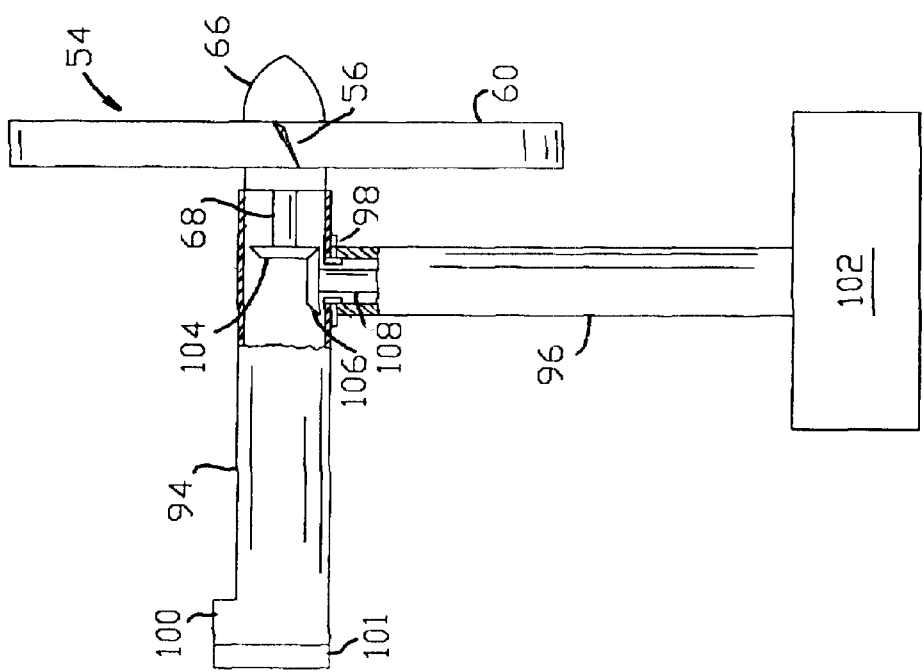

FUNNELED ROTARY FOIL

BACKGROUND OF INVENTION

This invention relates to the field of aerodynamics, and more particularly to improvements in rotatable airfoils such as propellers, helicopter rotors, and wind powered devices for converting wind energy into electrical or mechanical power. All such devices use blades, which are rotatably mounted and have aerodynamic airfoil shapes designed according to well-known a conventional rules using aerodynamic formulas known to those skilled in the art.

The same laws of aerodynamics applying to rotary airfoils also apply to aircraft wings. The conventional formulas utilize the terminology appropriate to the aerodynamic forces on an aircraft wing, as follows:

$$\text{Lift} = C_L \rho/2 V^2 S$$

and $$\text{Drag} = C_D \rho/2 V^2 S$$

where $C_L$ is the coefficient of lift, $C_D$ is the coefficient of drag, $\rho$ is air density, V is the air velocity, and S is the wing area. A line from the leading edge to the trailing edge of the airfoil is the "chord" of the airfoil, and an angle $\alpha$ between the chord and the direction of airflow relative to the airfoil is termed the angle of attack. $C_L$ depends mainly on the angle of attack. $C_L$ values range from negative to about 4.5, but are usually from 0.3 to 1.5. Conventional wings stall (lose lift) above an $\alpha$ of about 15°. $C_D$ usually ranges from 0.004 to 20, and is composed of frictional drag due to air passing over the surface of the airfoil plus other drag forces produced by separation of airflow at the top of a wing at high angles of attack and air circulating lengthwise over the wing.

It is evident that lift and drag differ only in the coefficients $C_L$ and $C_D$ in the above formulas. The coefficient of drag, $C_D$ at medium speeds (below 0.8 of the speed of sound) is due mainly to frictional drag, which increases as velocity squared. The coefficient of lift, $C_L$ increases linearly; therefore, the lower the angle of attack ($\alpha$) the larger will be the L/D. The highest efficiency of a rotary airfoil when the airfoil is rotated by an energy source depends on attaining the highest lift to drag ratio possible.

The design considerations are different when the rotary airfoil is receiving energy from the wind and operating a wind powered device. The basic aerodynamic formulas of an airfoil are same, except that the angle of attack $\alpha$ is selected to produce the maximum lift. The blade is mounted to account for the velocity of the wind relative to the rotary movement of the airfoil in a direction perpendicular to the wind velocity. Here, the object is to produce the maximum lift, which is translated to torque on the shaft of the wind powered device. Although the drag is also great, it is accommodated by the structure holding the rotating blade.

Lift or thrust is known to increase as the square of the air velocity according to the above conventional formulas. If conventional air velocity across the top of an airfoil were increased, the resulting increased imbalance in air pressure would greatly increase the lift. Suggestions have been made in the prior art for increasing the velocity over an aircraft wing for this purpose. U.S. Pat. No. 6,138,954 issued Oct. 31, 2000 to Gaunt proposes retractable slats angled above the leading edge of aircraft wings so as to form a funnel over each wing to provide increase air speed over the wing and increase lift.

U.S. Pat. No. 5,772,155 issued Jun. 30, 1998 to Nowak proposes retractable delta flaps deployed above the wing to delay flow separation on the back of the wing at increased angles of attack.

U.S. Pat. No. 1,787,321 issued Dec. 30, 1930 to Orr proposes a pair of complementary airfoils located on either side of the leading edge of an aircraft wing to form a Venturi opening in proximity to the leading edge of the wing funneling air over both the top and bottom of the wing for the alleged purpose of increasing the lifting effect during the forward propulsion of the aircraft.

Leading edge slots (known as "slats") are well-known in the prior art of aircraft wings. These comprise auxiliary members forming a contoured slot through the airfoil with an opening on the pressure side below the leading edge and exit on the suction side above and beyond the leading edge. Slats are formed by rigidly attaching a curved sheet of metal or a small auxiliary airfoil to the leading edge of the wing to form a Venturi-shaped slot. The slat prevents the breakdown in the flow over the upper surface of the wing and extends the working range of the angle of attack. The primary purpose of the slat is to prevent detachment of the airflow over the suction side of the wing.

Slats have been applied for a similar purpose to rotary airfoils, specifically propellers. U.S. Pat. No. 4,840,540 issued Jun. 20, 1989 to Kallergis, and British Patent Number 460,513 dated Apr. 4, 1936 in the name of Fairey Aviation Company Limited add slats to aircraft propellers in order to suppress flow separations and reduce noise. The propeller slats create a Venturi with opening on the pressure side of the airfoil section and exit at a higher velocity on the suction side of the airfoil section. The propeller slats of the aforementioned patents do not extend the full length of the blade, since they are intended to function only along a portion of the blade length.

Accordingly, one object of the present invention is to provide an improved rotary airfoil system providing increased lift.

Another object of the invention is to provide an improved rotary airfoil system in which the lift to drag ratio is maximized for propellers and the like.

Another object of the invention is to provide an improved rotary airfoil system for producing increased lift in a wind powered device.

SUMMARY OF INVENTION

Briefly stated, the invention comprises a funneled rotary foil comprising a rotatably mounted hub having an axis of rotation, a plurality of circumferentially spaced blades mounted on the hub so as to extend in a generally radial direction from the hub to a blade tip so as to be rotatable in a plane of rotation about the axis, each blade having a cross-section defining an airfoil with a suction side, a leading edge, a trailing edge, and defining a chord extending therebetween, the airfoil increasing gradually in thickness from the leading edge to a point of maximum thickness and thereafter decreasing in thickness, a fin attached to the blade tip and adapted to block radial flow from the blade tip, and a funnel strip mounted on each of the blades uniformly spaced from the suction side thereof and extending in a generally radial direction along the full length of the blade, the funnel strip having an inlet edge defining a funnel inlet area with the airfoil leading edge and having an outlet edge spaced from the suction side at approximately the point of maximum thickness to define a funnel outlet area, the funnel plate being oriented with respect to the chord so as to scoop in and increase the velocity of air flowing over the suction side of the airfoil, and dimensioned such that the ratio of inlet area to outlet area lies between and including the range of 2:1 to 20:1. Funnel angles are specified according to whether the funneled rotary foil is functioning as a wind-driving device or as a wind-driven device.

BRIEF DESCRIPTION OF DRAWINGS

The invention will be better understood by reference to the following description, taken in connection with the accompanying drawings, in which:

FIG. 7 is a side elevational view of a wind powered generator using a single funneled rotary foil, and FIG. 8 is a side elevational view of a wind energy device utilizing a double funneled rotary foil.

DETAILED DESCRIPTION

Figure 1:
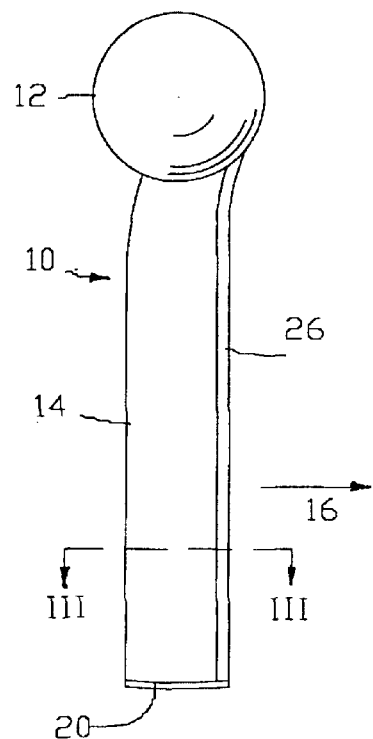
FIG. 1 is a front elevational view of a funneled rotary airfoil designed as a propeller, only one blade of the propeller being illustrated.
Figure 2:
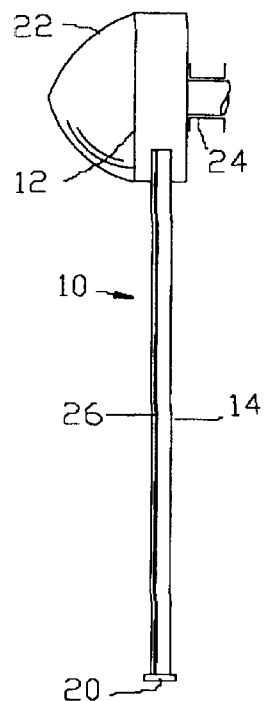
FIG. 2 is a side elevational view of the propeller FIG. 1.

Referring now to FIGS. 1 and 2 of the drawing, a propeller, shown generally at 10 comprises a hub 12 and blade 14. Blade 14 is one of a plurality of blades, which could number from 2 to 6 or more. Only such blade 14 is shown in FIG. 1, it being understood that the actual number of blades, numbering 2 to 6 would be circumferentially spaced around the hub 12 in a conventional fashion.

Blade 14 extends in a generally radial direction from hub 12 and rotates in a direction indicated by arrow 16 about an axis 18 of hub 12 in a plane of rotation. The tip of each blade is provided with a fin attached to the blade tip to block radial flow of air longitudinally along the blade.

Referring to FIG. 2, the propeller is conventionally supplied with a fairing cone 22 and is rotatably mounted on a shaft in bearings as depicted schematically at 24.

In accordance with the present invention a funnel strip 26 is mounted above the top (suction side) of the airfoil and adapted to create a funnel-shaped passage designated to increase the velocity of air flowing over the suction side of the airfoil.

Figure 3:
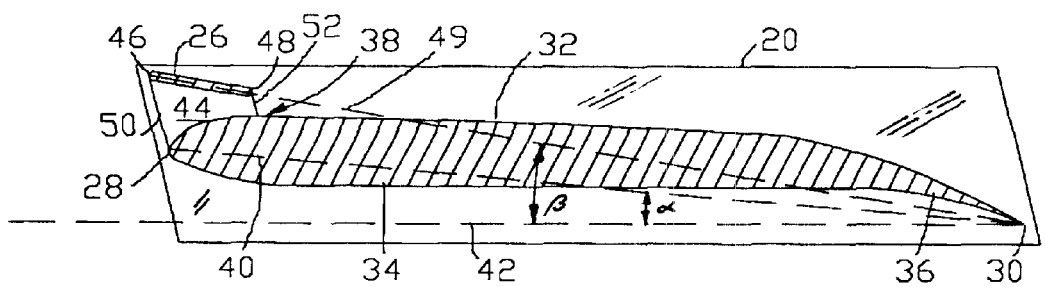
FIG. 3 is an enlarged cross-sectional view of a single blade of the propeller taken along lines III—III of FIG. 1.

Referring to FIG. 3 of the drawing, the enlarged cross-sectional view of the funneled rotary foil shows an airfoil cross section designed as a supercritical airfoil. The airfoil includes a leading edge 28, a trailing edge 30, a suction side 32, a pressure side 34, and a downwardly angled cusp 36 near the trailing edge. The thickness of the cross section increases from leading edge 28 to a maximum thickness at point 38 on the suction side, and then decreases very gradually with a nearly flat surface for 70% of its length, before curving down to form cusp 36. The method of design of such a supercritical airfoil cross section is well known to those skilled in the art. The chord of the airfoil is shown at 40 as a line extending between the leading and trailing edges of the blade. The airfoil is deployed on the hub to form an angle of attack α between line 40 and the plane of rotation of the blade, which is indicated by line 42.

In accordance with the present invention, the funnel strip 26 is mounted and attached to the blade 14 to run the entire length thereof from the hub 12 to the fin 20. Additional supporting struts 44 may be spaced longitudinally along the propeller blade to hold the funnel strip 26 in the position shown in FIG. 3. Funnel strip 26 is a substantially flat plate as shown in FIG. 3 with an inlet edge 46 and an outlet edge 48. A line 49 from the trailing edge 30 of the airfoil to the inlet edge 46 of the funnel strip forms a larger funnel angle β with the plane of rotation 42.

Funnel strip 26 is oriented so as to be with respect to the chord 40 of the airfoil and, as seen from the drawing, functions as a funnel to scoop air in at an inlet 50 to an outlet 52 as the blade rotates in the plane of rotation. The funnel passage from inlet 50 to outlet 52 is bounded at the blade tip by fin 20 and at the blade root by the hub 12.

The dimensions and location of funnel strip 26 are such that the ratio of total area of the inlet 50 divided by the total area of the outlet 52 lies in a range between 2 to 1 and 20 to 1. In the embodiment shown in FIG. 3, this ratio of inlet area to outlet area is 4 to 1, the angle of attack α is 5°, and the funnel angle β is 10°. These parameters are only exemplary of a range of values, which vary with the design. Angle α may vary from 3° to 7° while angle β varies respectively from 8° to 12° for a given blade and funnel geometry.

Airflow through a funnel can increase the velocity of the air as much as twenty fold with little loss of energy. Aerodynamically, $area_1 \times velocity_1 = area_2 \times velocity_2$ minus drag due to friction. Hence the theoretical air velocity over the top, almost flat, suction side 32 of blade 14 in the arrangement shown in FIG. 3 is four times that of the conventional air velocity. Hence, the theoretical lift is sixteen times as great minus the losses due to the drag. Since the blade is designed or oriented for the highest L/D, a greatly improved thrust to the propelled device is the result of the funnel strip attached to the blade.

As an example, a small prototype was constructed for a rotary airfoil without the funnel strip, which performed according to the following table.

| RPM | Lift (lb.) | Actual HP | RPM/lb. of Lift | Drag (lb.) | Lift/Drag (L/D) | Lift (lb.)/ HP |
|---|---|---|---|---|---|---|
| 5000 | 1.6 | 0.054 | 3125 | 0.13 | 12.3 | 29.6 |
| 7000 | 3.2 | 0.09 | 2188 | 0.15 | 21.3 | 35.6 |

Calculations indicate that a funneled rotary airfoil constructed like the prototype, but adding the funnel strip according to the invention, would probably have the characteristics according to the following table.

| RPM | Lift (lb.) | Actual HP | RPM/lb. of Lift | Drag (lb.) | Lift/Drag (L/D) | Lift (lb.)/ HP |
|---|---|---|---|---|---|---|
| 5000 | 9.0 | 0.09 | 360 | 0.15 | 93 | 100 |
| 7000 | 12.6 | 0.11 | 390 | 0.16 | 106 | 115 |

Wind Powered Device

Figure 5:
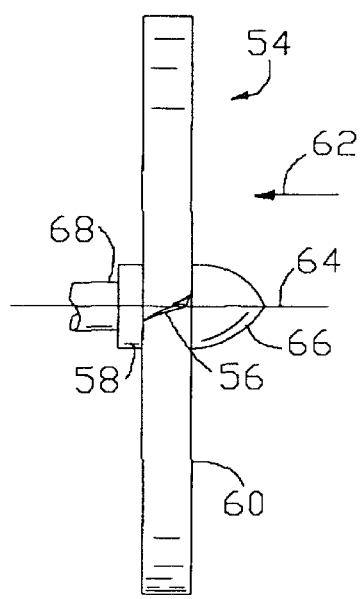
FIG. 5 is a side elevational view of the funneled rotary foil of FIG. 4.
Figure 4:
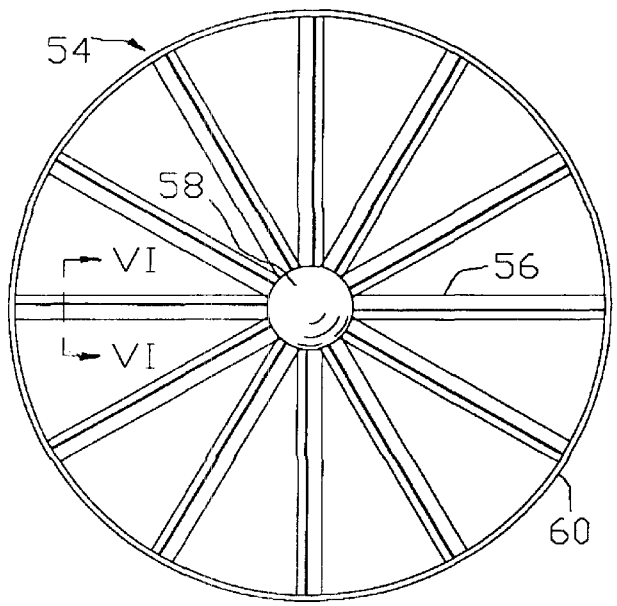
FIG. 4 is a front elevational view of a funneled rotary foil for a wind powered device using the present invention.
Figure 6:
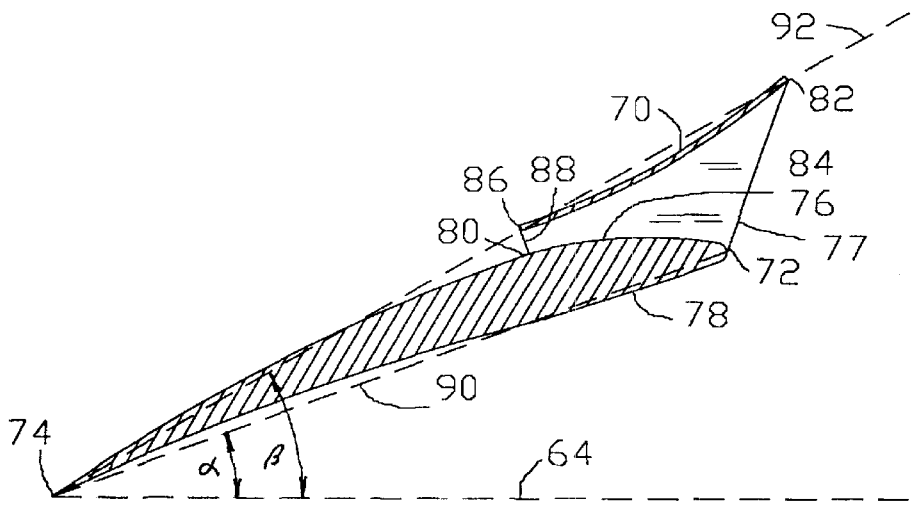
FIG. 6 is an enlarged cross-sectional view of a single blade of the funneled rotary foil of FIG. 4 taken along lines VI—VI of FIG. 4.

Referring now to FIGS. 4 through 6 of the drawings, a funneled rotary foil is illustrated which is designed for a wind powered device. Contrary to a propeller, in which an energy source applies torque to the hub to cause the blades to rotate, a wind powered device is designed to receive energy from the wind and convert the energy to torque applied to the hub and attached shaft. The type of wind powered device driven by the funneled rotary foil is immaterial to the present invention, but could be an electric generator, compressor, pump, etc. The airflow is perpendicular to the plane of rotation as in the case of the propeller. However, the design criteria are different, since the funneled rotary foil is designed and oriented with respect to the plane of rotation so as to produce maximum lift. Hence the angle of attack α and funnel angle β will be different.

Referring to FIG. 4, a funneled rotary foil 54 comprises a group of circumferentially spaced, radially extending blades 56 attached to a hub 58. The funneled rotary foil 54 of FIG. 4 has twelve blades. However, the number of blades believed to be practical for wind powered device ranges from six in number to twelve in number. Blades 56 are identical and are of substantially uniform width from the hub to the blade tip. The blade tips are connected to a circular rim 60, which both serves to prevent longitudinal flow along the blade, as well as to stabilize and strengthen the device.

Referring to FIG. 5 of the drawing, the side view of the funneled rotary foil is illustrated. The direction of the wind, indicated by arrow 62 is perpendicular to the plane of rotation of blades 56. The blades and hub rotate about an axis of rotation 64. A fairing cone 66 directs flow into the blades, which are oriented and designed to provide the maximum lift. Lift, as calculated by the previous formulas is translated to torque applied to a rotatable shaft 68.

In accordance with the present invention, each of the blades 56 is provided with a funnel strip 70 designed, oriented and dimensioned to increase the effective flow velocity over the suction side of blades 56 to increase the lift.

Referring to FIG. 6 of the drawing, a cross section of the blade 56 is seen, which is a cross section taken along lines VI—VI of FIG. 4. As seen in the cross section, the airfoil has a leading edge 72, a trailing edge 74, a suction side 76 and a pressure side 78. The blade increases in thickness from the leading edge 72 to a point of maximum thickness 80, and thereafter decreases in thickness to the trailing edge. The airfoil cross section is a conventional shape designed to extract energy from wind of an average velocity that may be between 5 and 50 feet per second.

In accordance with the present invention, a funnel strip 70 is mounted to blade 76 by one or more struts 77 and extends radially in uniformly spaced relationship to the blade. The funnel strip is arcuate with a convex side directed toward the suction side of the blade. The funnel strip has an inlet edge 82, which defines an inlet 84 with the leading edge 72 of the airfoil leading into a funnel shaped passage. The strip has an outlet edge 86, which defines an outlet 88 with the suction side 76 of the airfoil at the point of maximum thickness of the airfoil. The funnel shaped passage is bounded at the outer blade tip by rim 60 and at the blade root by hub 58. The ratio of the area of inlet 84 to the area of outlet 88 lies between the range of 2 to 1 and 20 to 1.

A chord of the airfoil is shown at 90 extending from trailing edge 74 to leading edge 72 of the airfoil cross section. A line directed from the trailing edge through the inlet edge 82 of funnel strip 70 is shown at 92. The angle of attack on the blade 56 when it is stationary is the angle α between chord 90 and the wind vector 62, which corresponds to the axis of rotation 64 when the blades are properly oriented toward the wind. The rotational velocity of the blade 56 (which depends upon the radius at which the velocity is computed) results in a resultant airflow over the airfoil at a lower effective angle of attack. Since the actual velocity of the wind varies, a compromise is necessary under an assumed wind velocity and assumed rotational velocity of the blades.

The preferred arrangement shown in FIG. 6 mounts the blade 56 on hub 58 such that the line 92 forms a second funnel angle β of approximately 30° with the rotational axis 64. In this case, the angle of attack is about 20°. These parameters are only exemplary of a range of values, which vary with the design. Angle α may vary from 14° to 26°, while angle β varies respectively from 24° to 36° for a given blade and funnel geometry. The profile of a single blade 56 is shown superimposed on rim 20 in FIG. 4, in order to show the orientation of the blade on the hub.

In the preferred embodiment shown in FIG. 6, the ratio of areas of inlet 84 to outlet 86 is 8 to 1. Under these assumed conditions, the airfoil is designed according to conventional design formulas to produce the maximum lift, assuming a theoretical velocity increase over the suction side of the airfoil of 8 to 1.

FIG. 7 illustrates one embodiment of a wind powered device using a funneled rotary foil 54 as previously described in FIGS. 4–6 of the drawing. The drawing depicts a streamlined fuselage 94 pivotably mounted on a tubular column 96 by means of a bearing 98, so as to be able to pivot when the wind direction changes. A tail structure 100 with an adjustable rudder 101 facilitates pivoting the fuselage 94 like a weather vane, so that the plane of rotation of funneled rotary foil 54 is always perpendicular to the direction of the wind. Column 96 is mounted on top of a base 102 containing equipment to be powered. The equipment (not shown) could be an electric generator, a heat pump, a compressor, or any one of a myriad of devices designed to derive power from the wind. Means for transmitting torque from the rotatable shaft 68 is depicted schematically as a bevel gear 104 meshing with a bevel gear 106 on a vertical shaft 108. The type of power transmission to the wind powered device in 102 is immaterial to the present invention and could comprise various types of mechanical drives, or alternatively hydraulic, pneumatic or electrical devices for transmitting power. The adjustable rudder 101 may be used to counteract any reaction tending to pivot the fuselage around vertical shaft 108.

FIG. 8 illustrates another arrangement for a wind powered device in which two funneled rotary foils are mounted on the same fuselage, indicated at 110. The funneled rotary foil 54 and power transmission train comprising shaft 68, bevel gear 104, bevel gear 106, and vertical shaft 108 may be identical to those in FIG. 7, as well as the supporting column 96 and base structure 102.

An additional funneled rotary foil, designated 112 is rotatably mounted in fuselage 110, with power output shaft 114 and bevel gear 116 meshing with the same previously described bevel gear 106. The gear arrangement is such that funneled rotary foil 112 rotates in the opposite direction from that of funneled rotary foil 54. A profile of the oppositely oriented blade with attached funnel strip is superimposed on the rim as indicated at 118. In order to pivot the fuselage so that the plane of rotation is always perpendicular to the wind, a tail structure 120 is added to the fuselage.

Conclusion

All of the above shows that a funneled rotary airfoil is a unique technology that can profoundly improve propulsion, lift and also convert wind energy into electrical or mechanical power. It could achieve 75–95% efficiency. Many variations are possible. One example would be to use wind power to operate a commercial heat pump, which converts mechanical energy into heat energy at an efficiency of 400–500%. The normal energy process for powering a heat pump involves burning a fuel such as coal, oil or natural gas to generate steam. Fuel to steam conversion is about 90% efficient. A steam turbine converts heat energy into electrical energy at about 40% efficiency, and an electric motor turns it into mechanical power at about 90% efficiency. The motor operates a compressor at about 90% efficiency. The heat pump, if operating at 400% of its mechanical input only achieves about 29% of the initial heat energy input at the compressor: 0.29×400=117% of the heat energy of the original fuel input. Nearly all non-nuclear future electricity generating plants will release carbon dioxide and nitrogen oxides. Wind energy harnessed by this upper wind powered generator requires no fuel at a 90% mechanical energy input (compressor) to get 400% mechanical-to-heat energy. This totals at least a 360% efficiency heating method with no adverse gases. The energy of the wind is amplified 3.6 times for home/business/building/factory, etc. heat during the cold months and air conditioning during the warm periods. The funneled rotary foil, wind powered generator would be an excellent energy generating device, converting nearly 100% of the wind energy into mechanical energy or about 90% of the wind's energy into electricity.

What is claimed is:

1. A funneled rotary foil comprising:

a rotatably mounted hub having an axis of rotation, a plurality of circumferentially spaced blades mounted on said hub so as to extend in a generally radial direction from the hub to a blade tip so as to be rotatable in a plane of rotation about said axis, each said blade having a cross-section defining an airfoil with a suction side, said airfoil having a leading edge, a trailing edge, and defining a chord extending therebetween, said airfoil increasing gradually in thickness from the leading edge to a point of maximum thickness and decreasing in thickness thereafter to the trailing edge, a fin attached to the blade tip and adapted to block radial flow from the blade tip, and a funnel strip mounted on each of said blades uniformly spaced from the suction side thereof and extending in a generally radial direction along the full length of the blade, said funnel strip having an inlet edge defining a funnel inlet area with the airfoil leading edge and having an outlet edge spaced from the suction side at said point of maximum thickness to define a funnel outlet area, said funnel plate being oriented with respect to the chord so as to scoop in and increase the velocity of air flowing over the suction side of the airfoil, and dimensioned such that the ratio of inlet area to outlet area lies between and including the range of 2:1 to 20:1.

2. The funneled rotary foil according to claim 1, wherein said funnel strip is substantially flat.

3. The funneled rotary foil according to claim 1, wherein said funnel strip has an arcuate cross-section having a convex side and is disposed with said convex side facing the suction side of the airfoil.

4. The funneled rotary foil according to claim 1, wherein the blades are mounted to the hub so that a line through the airfoil trailing edge and the funnel strip leading edge forms a first funnel angle between 8° and 12° with respect to the plane of rotation, whereby the funneled rotary foil serves as a propeller when the hub is rotated.

5. The funneled rotary foil according to claim 4, wherein said first funnel angle is on the order of 10°.

6. The funneled rotary foil according to claim 4, wherein the number of blades are selected from a group consisting of 2, 3, 4, 5 and 6.

7. The funneled rotary foil according to claim 1, wherein the blades are mounted to the hub so that a line through the airfoil trailing edge and the funnel strip inlet edge forms a second funnel angle between 24° and 36° with respect to the axis of rotation, whereby the funneled rotary foil serves as a wind-powered device to cause the hub to rotate.

8. The funneled rotary foil according to claim 1, wherein said second funnel angle is on the order of 30°.

9. The funneled rotary foil according to claim 7, wherein the number of blades are selected from a group consisting of 6, 7, 8, 9, 10, 11 and 12 and wherein the blade fins together comprise a single cylindrical rim.

* * * * *